United States Patent Office 3,140,257
Patented July 7, 1964

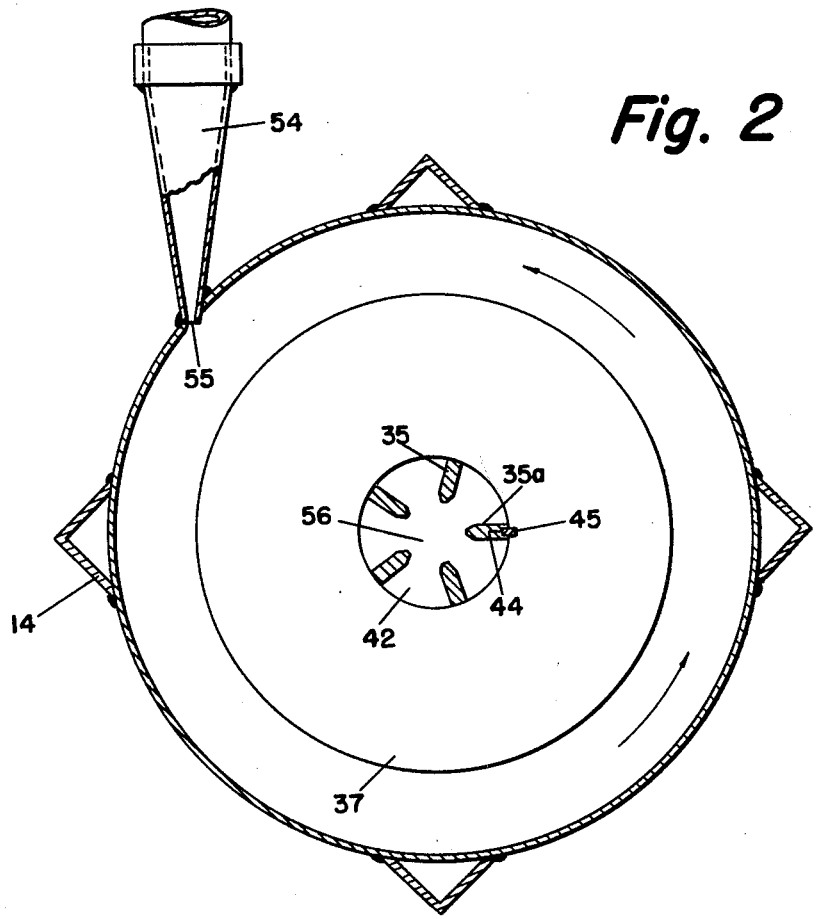

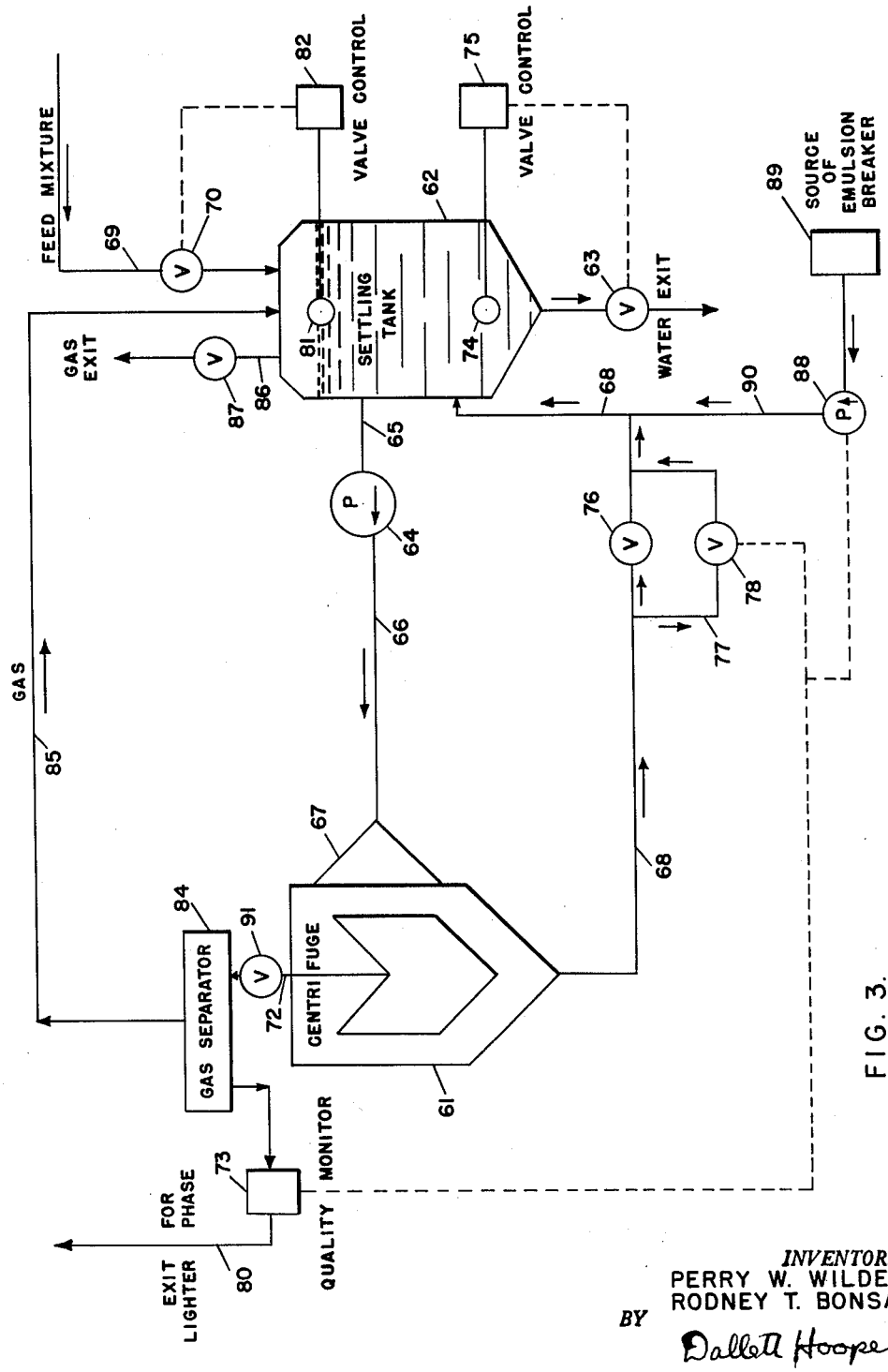

3,140,257
CENTRIFUGAL SEPARATION PROCESS AND
APPARATUS
Perry W. Wilder, Jr., and Rodney T. Bonsall, Jr., Philadelphia, Pa., assignors to Pennsalt Chemicals Corporation, a corporation of Pennsylvania
Filed May 29, 1961, Ser. No. 113,475
9 Claims. (Cl. 210—51)

This invention pertains generally to the separation of phases, and more particularly to the separation of liquid phases of different densities, with or without the presence of solids and/or gases.

While the prior art is replete with all manner of processes and apparatus for the separation of phases occurring in admixtures of solids, liquids and/or gases, the suitability and acceptability of a process and apparatus in certain fields is limited to (1) ability to accommodate a feed mixture supplied at a varying rate, (2) the capability of being produced and operated at relatively low cost, and (3) the capability of making clean separations rapidly under conditions of high volume throughout.

In the search for a device capable of meeting the above-mentioned qualifications, the cyclone separator suggests itself, since it is a simple and rugged apparatus which can be operated for long periods of time with very little supervision or maintenance requirements. Cyclone separators, however, are not, in general, suitable for the separation of liquid phases from each other. The centrifugal separator, on the other hand, may be made to function excellently for this purpose, even in the presence of solids, and various types are available for the purpose. A centrifugal separator, however, is a device having a rotating bowl of considerable mass, and its fabrication involves considerable expense, not only from the standpoint of materials suitable for the purpose, but also of obtaining proper balance. Also, there are rather rigid limitations upon the solids handling capacity of a centrifuge of a given size, as well as upon the size itself, if the centrifuge rotor is to be rotated at a speed sufficiently high to develop a centrifugal force adequate to make the desired separation or separations at an acceptable rate.

Another prior means to be considered in the search is a process and apparatus described and claimed in co-pending application Serial No. 3532, filed January 20, 1960, by Andre C. Lavanchy, and now abandoned. The applicant in said co-pending application proceeds by the direct application of centrifugal force to the mixture in a main zone of separation, e.g. by flowing the mixture from the periphery toward the center of a revolving disc stack or similarly functioning device, while feeding the mixture to the periphery of the main zone of separation from a preliminary separating zone which takes the form of a revolving annulus of feed mixture surrounding and contiguous with the main zone of separation, and which is confined outwardly by a stationary shell. In operation, the mixture is fed from a fixed point tangentially under pressure into said preliminary separating zone about the periphery of the main zone of centrifugation under conditions which maintain said mixture in rotating condition, during which the mixture is conducted inwardly from said outer zone toward the center of said main zone through a region in said main zone comprised of a rotor having a plurality of separating spaces, such as a disc stack or similarly functioning device, thereby to separate said mixture into an inwardly flowing liquid phase of lesser density and an outwardly flowing liquid phase (with or without solids) of greater density. The liquid phase of lesser density is conducted in separated condition from the interior of said main zone to the exterior thereof under the pressure of the feed of the mixture, and the liquid phase of greater density together with any solids present in the feed mixture is removed in separated condition from the periphery of said outer zone.

The present invention is applicable to the operation of the process and apparatus of said co-pending application, contributing to it improved results, making it especially attractive under the set of requirements outlined above. For instance, the invention which is the subject of this application improves the ability of the earlier fixed shell centrifuge to handle a feed mixture supplied at a varying rate. Separation in high volume throughput is also improved.

In the earlier device because the shell is stationary, the driving influence of the rotating disc stack or similar elements on the liquid mixture in the bowl diminishes outwardly from the periphery of the disc stack as the wall is approached. The component of the velocity of the mixture adjacent the shell or wall contributed by the rotating disc stack may be close to zero. The controlling component of velocity of the mixture in this annular zone is the velocity of the feed entering the zone through the generally tangentially directed inlet. Changes in the velocity of the mixture entering the bowl through the inlet will have great effect on the velocity of the mixture adjacent the wall and hence the centrifugal pressure in this zone. Because the centrifugal pressure in this zone will influence the position of the interface, and because stability of the interface position is desired for good separation, velocity of feed through the inlet should be maintained as close to uniform as possible. Near uniformity is achieved by recycle under the present invention and even with a fluctuating feed rate from the feed source, flow to the centrifuge inlet is relatively constant and the separation is improved.

Also it has been found in connection with the earlier device that in the case of extremely difficult separations, and particularly when tight emulsion is present, e.g. oil-water emulsion in the case of water-containing crude petroleum oils, an inordinant amount of light phase accompanies the heavier phase discharged from the centrifuge, and that it is extremely difficult, if not virtually impossible, from a practicable point of view, to recover by centrifugal force the lighter phase from such discharged heavier phase. We have discovered that if the heavier phase so discharged is subjected to a settling operation, some of the heavier phase will settle out of the mixture, with consequent enrichment of the mixture in the lighter phase, and that by recycling the thus enriched mixture with fresh feed to the centrifuge, the lighter phase may be obtained from the centrifuge virtually completely denuded of heavier phase, and the heavier phase from the settling operation virtually completely denuded of lighter phase.

Further features of the invention will become apparent as the specification proceeds, particularly upon reference to the drawings in which:

FIGURE 2 is a section on line 2—2 of FIGURE 1; and

FIGURE 3 is a flow sheet illustrating an embodiment of the invention.

Figure 1:
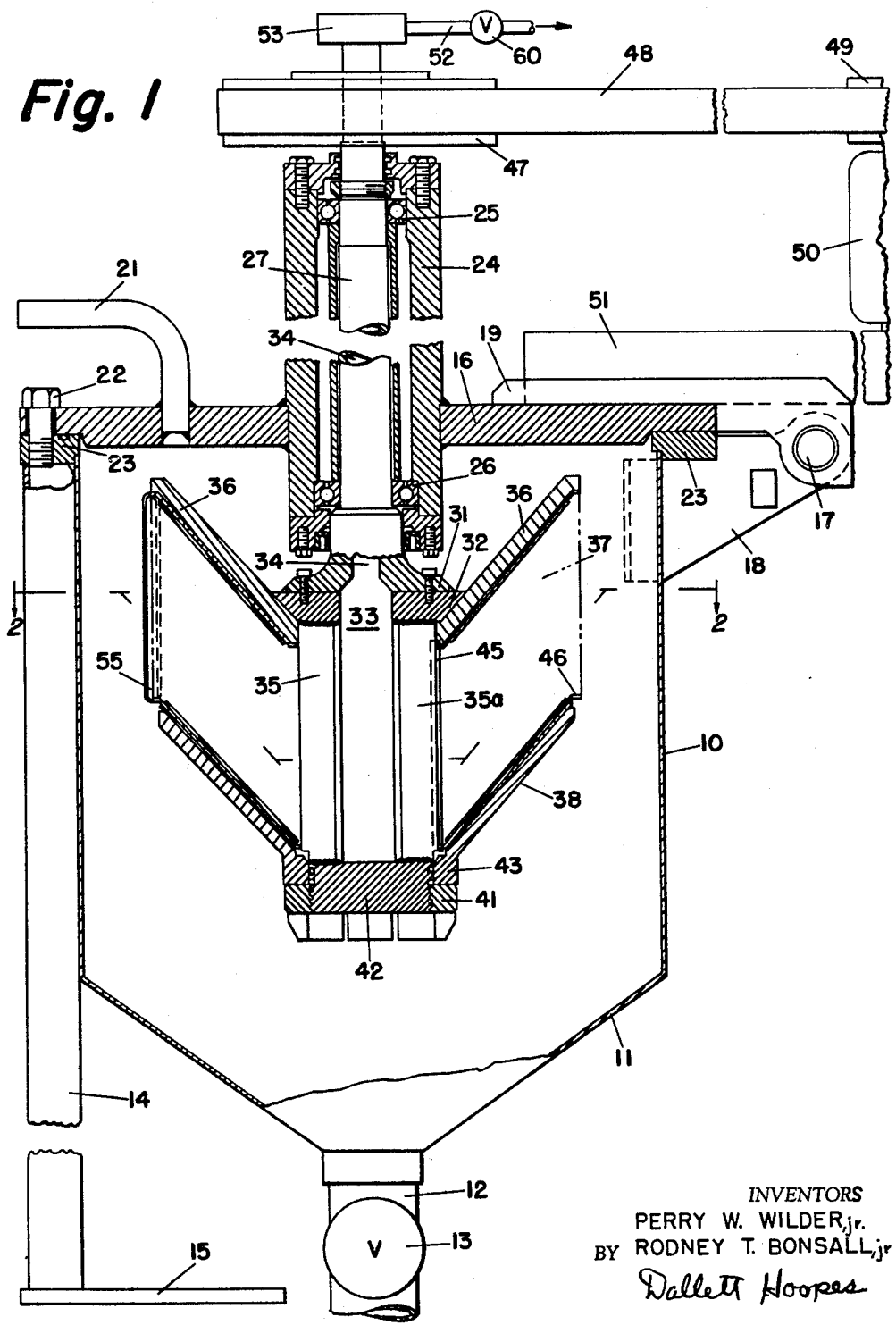
FIGURE 1 is an elevation largely in section of apparatus described and claimed in said co-pending application.

Referring now more particularly to FIGURES 1 and 2, at 10 is shown a stationary casing having a conical bottom 11 with an outlet 12 illustrated as controlled by a valve 13. Casing 10 is illustrated as being supported in vertical position by a post 14 having a foot 15, post 14 being secured to the side of casing 10 by any suitable means, such as welding.

Casing 10 is shown provided with a top 16 hinged to casing 10 as illustrated at 17. One arm 18 of hinge 17 is secured to the side of casing 10, and the other arm 19 of hinge 17 is secured to the upper face of top 16, in each instance such as by welding.

Top 16 is illustrated as having a handle 21 for raising and lowering top 16 about hinge 17, and as being secured in closed position by means of screw 22 which engages annulus 23 positioned around and secured to the top of casing 10, e.g. by welding.

Secured to top 16 centrally thereof, and projecting both above and below top 16, is a tubular member 24 within which is supported and journaled, such as by bearings 25 and 26, a tubular shaft 27.

The lower end of shaft 27 is provided with a flange 31 to which is attached a bevelled annulus 32 by any suitable means, such as illustrated, annulus 32 being provided with a central channel 33 in communication with central channel 34 of shaft 27.

Secured to, such as by welding, and projecting downward from annulus 32 are a plurality of circumferentially spaced ribs 35 about which are positioned an upper frusto-conical end member 36, a disc stack 37, and a lower frusto-conical member 38, all of which are held in position by nut 41 which engages cooperating threads on member 42 secured, such as by welding, to the bottom ends of ribs 35, frusto-conical member 38 being provided with a collar 43 for engagement by nut 41 in compressing the members together.

One of the ribs, i.e. rib 35a, is provided with a longitudinal slot 44 in which is positioned key 45 which projects outwardly into slots in the inner edges of spaced discs 46 of disc stack 37 for disc orientation purposes. Similar slots may be provided in the inner edges of frusto-conical members 36 and 38 for engagement by key 45, if desired.

The upper end of shaft 27 projects beyond tubular member 24, and as shown is provided with a pulley 47 engaged by belt 48 which in turn engages a pulley 49 on motor 50. As illustrated, motor 50 is mounted on a support 51 secured, such as by welding, to top 16.

A liquid flow connection is made between stationary effluent receiving conduit 52 and the top of hollow shaft 27 through a liquid sealing connection 53 which may be of any desired design and construction, several of which are well known in the art. Valve 60 may be provided for flow control purposes, if desired.

The mixture to be separated is fed into casing 10 tangentially, and preferably in line with the vertical dimension of the periphery of disc stack 37, through feed spout 54 which is provided with a flat longitudinal feed opening as illustrated at 55 in FIGURE 1.

In operation, the mixture to be separated is pumped into casing 10 through feed spout 54 under velocity conditions to provide a rotating annulus of feed mixture in contact with the outer periphery of the disc stack 37, preferably over substantially its entire vertical dimension at its periphery. Any suitable means may be employed for imparting the desired velocity conditions in the feed mixture, such as a positive displacement pump.

Simultaneously with the feeding of the feed mixture into casing 10 through feed spout 54, disc stack 37 is rotated by means of motor 50 in the same rotational direction, such direction being counter-clockwise as seen in FIGURE 2.

Due to the rotation of the annulus of feed mixture in casing 10 in the space around the periphery of disc stack 37, relatively large particles of solids and/or relatively large globules of heavier phase liquid, if present, are thrown outwardly by centrifugal force and are deposited on the inner surface of casing 10 in the immediate vicinity of which the rotation is at a minimum, and down which they slide and collect at the bottom. Simultaneously with such separation, the feed mixture enters disc stack 37 and flows inwardly through the thin separating spaces between spaced discs 46. Under the influence of centrifugal force generated by the rotation of disc stack 37, heavier liquid phase and any solids present are separated from the lighter liquid phase in said thin separating spaces, and move outwardly from disc stack 37, being deposited on the inner surface of casing 10 down which they slide for collection in the bottom thereof. Should any solids be present that are lighter than the lighter liquid phase, these are carried off floating on the lighter liquid phase.

Lighter liquid phase, separated from heavier liquid phase and solids in disc stack 37, continues to flow inwardly and enters space 56 located centrally of ribs 35. From space 56 lighter liquid phase flows upwardly through channels 33 and 34 and from the machine through stationary conduit 52.

Heavier liquid phase and solids, in the apparatus so far described, are permitted to accumulate in conical bottom 11 of casing 10, and are removed therefrom through outlet 12 as desired or required, continuously or intermittently, preferably in a manner to maintain a more or less uniform level between separated heavier liquid phase and the incoming feed mixture.

It will be noted that member 42 is imperforate as are frusto-conical members 36 and 38 which confines the entrance of the feed mixture into disc stack 37 to the area surrounding the outer periphery of discs 46.

It will, of course, be understood that the pressure on the feed mixture entering casing 10 through feed spout 54, and the back pressure at outlet 12 which is controlled by valve 13, are sufficient to deliver separated lighter liquid phase to conduit 52 at the desired outlet pressure.

For cleaning purposes, both of disc stack 37 and of the interior of casing 10, cap screw or screws 22 are removed, and top 16 together with attached mechanism swung about hinge 17 to bring the disc stack together with associated mechanism up out of casing 10. It will be noted that since support 51 for motor 50 is attached to top 16, the foregoing may be accomplished without disturbing the driving connection between motor 50 and shaft 27.

The foregoing description of FIGURES 1 and 2 pertains entirely to the process and apparatus described and claimed in said co-pending application.

Coming now to the present invention, and upon reference to FIGURE 3, a centrifugal separator of the type particularly described in connection with FIGURES 1 and 2 is illustrated diagrammatically at 61. A gravity settling tank is shown at 62 having an outlet at its bottom controlled by a valve 63. 64 preferably is a constant volume pump having its inlet connected to the upper part of tank 62 through line 65 and its outlet connected to the periphery of centrifuge 61 through line 66 and an elongated feed spout illustrated at 67. The heavy phase outlet of centrifuge 61 is connected to tank 62 through line 68 which is connected to tank 62 at a suitable point spaced above its bottom. Feed mixture is introduced into the top of tank 62 through line 69 controlled by valve 70.

With the rotor in centrifuge 61 in operation as described in connection with FIGURES 1 and 2, feed mixture, i.e. of petroleum oil and water, from tank 62 is pumped, preferably by constant volume pump 64, tangentially into the periphery of the centrifuge 61, preferably in constant volume.

The pressure on said feed mixture, and the back pressure in line 68, are such as to cause the lighter phase in said feed mixture to travel inwardly of the rotor in centrifuge 61 while being separated from the heavier effluent, and to be delivered axially of centrifuge 61 through outlet 72.

The heavier effluent after separation from the feed mixture in centrifuge 61 is discharged from the bottom of centrifuge 61 and flows to tank 62 through line 68. Solids and water settle out in tank 62 and are withdrawn therefrom through valve 63, which, if desired, may be hand operated. Unseparated lighter phase accompanying the heavier effluent from centrifuge 61, whether or not in the form of an emulsion of lighter and heavier phase, being of a density less than that of the settled and settling heavier phase, rises in settling tank 62, and eventually is returned to centrifuge 61 as recycle along with feed mixture entering tank 62 through line 69 and valve 70 which, if desired, also may be hand operated.

The rate of feed to centrifuge 61 through line 66 is controlled by pump 64, which may be operated at any desired speed.

A useful appurtenance is illustrated at settling tank 62 wherein float 74 controls the opening of valve 63 through valve control 75, float 74 rising to open valve 63 with rising level of separated heavier phase settled out in tank 62, and falling to close valve 63 with falling level of separated heavier phase in tank 62. Thus float 74 controls the level of separated heavier phase in tank 62, excess heavier phase together with solids escaping through valve 63.

Float-controlled valve-operating mechanism 75 may be of any desired design, construction and operation, many of which are available in the trade.

To provide a variable control of the back pressure in line 68, a valve 76 of fixed opening is shown inserted in line 68, and a by-pass line 77, the flow through which is controlled by valve 78, is so connected to line 68 as to by-pass valve 76. Quality monitor 73, shown inserted in the outlet line 80 for lighter phase, controls the opening and closing of valve 78, in this instance opening valve 78 with decrease in quality of the lighter phase being delivered to and through monitor 73 from outlet 72 to decrease the back pressure on and thus increase the flow of the heavier effluent through line 68 to tank 62, and vice versa. It will be understood that decrease in back pressure on the heavier effluent from centrifuge 61 decreases the rate of flow of lighter phase from centrifuge 61, thus, among other things, increasing the residence time of lighter phase in centrifuge 61 to prolong the application of centrifugal force thereto with increase in separating effect, whereas increasing the back pressure on the heavier effluent from centrifuge 61 decreases such residence time to decrease the separation effect.

Since it frequently is desired to operate at full capacity but nevertheless in a manner to assure the desired quality of the lighter phase (usually plus a reasonable margin of safety), appropriate back pressure on the heavier effluent from centrifuge 61 for the desired purpose is afforded at all times by the control of valve 78 through quality monitor 73, in the manner described.

The supply of feed mixture to tank 62 is shown controlled by float 81 which controls valve 70 through valve-operating mechanism 82, the latter being of any design, construction and operation known in the art. Float 81 rises with increase in the level of total liquid in tank 62 to close, partially or completely valve 70, and falls with the fall of such level to open, partially or completely valve 70, thus regulating the supply of feed mixture to tank 62 in accordance with requirements. The level of heavier phase in tank 62 is, as already described, controlled by float 74 which floats at the interface at the upper surface of settled heavier phase.

It happens on occasion that certain mixtures, e.g. a water-containing crude petroleum oil, whether or not said water is present partially or completely in emulsion form, also contain gases, e.g. in the case of crude petroleum oil, hydrocarbons that are gaseous at normal temperatures and pressures. Such gaseous substances separate with the lighter phase in centrifuge 61, and the presence of gaseous substances in the lighter phase frequently interferes with the normal operation of quality monitors, such as those that are responsive to the percentage presence of moisture in the separated petroleum oil. To cope with this situation, a gas separating tank 84 is shown inserted between outlet line 72 and monitor 73. The gas that separates from the oil in tank 84 rises to the top thereof, from which it is conveniently led to the top of settling tank 62, such as through line 85, as illustrated. From tank 62 such gas, together with any gas that separates from the feed mixture fed into tank 62, may be led off in any desired manner, such as through line 86 controlled by valve 87. Any other suitable arrangement for the bleeding off of gas from tank 84 may be substituted.

It is to be understood that in the practice of the invention auxiliary means may be utilized to assist in the breaking of emulsion in addition to the application of centrifugal force thereto. Such emulsion-breaking or emulsion-weakening auxiliary means may be of any useful type. One such auxiliary means is illustrated as comprised of a pump 88, also shown controlled by monitor 73, for the supply from source 89 to tank 62, through line 90 which connects to line 68, of a chemical emulsion-breaking substance, such as a surface acting agent, e.g. that known in the trade under the trademark Tretolite, and similar compounds or compositions well known in the art.

To provide for versatility in the operation of centrifuge 61, a valve 91 is shown inserted in outlet line 72 for the adjustment of back pressure on the lighter phase discharged from centrifuge 61. Thus, with back pressure adjusting means in both outlets from centrifuge 61, i.e. in both of lines 68 and 72, the pressure differential across centrifuge 61 between these outlets is made subject to adjustment, which in turn makes subject to adjustment the pressure on the feed delivered to centrifuge 61 by pump 64 which preferably is a constant displacement pump, i.e. a pump delivering liquid at a uniform rate at a given speed, irrespective of the pump outlet pressure.

It is preferable to have a pump 64 of constant displacement type to assure that the flow of the centrifuge is constant for reasons outlined above. Obviously to be effective pump 64 must have an ample supply of liquid. Such ample supply is not continuously provided by some feed sources 69. Under the present invention recycling the heavy outlet 68 with the feed mixture 69 always provides adequate supply to pump 64 and consequently the interface in the centrifuge remains relatively fixed in position.

Ratio of rate of flow in line 65 to the rate of flow in line 69 may be 8:1 illustratively. The most desirable adjustment depends on the particular situation and will be obvious to the mechanic skilled in the art.

Another benefit develops from the use of tank 62: improved separation of the lighter liquid from the heavy phase. The following examples of the operation of the invention are given by away of illustration and not of limitation:

*Example 1*

A mixture of oil having an API density rating of 30 at 100° F. and a viscosity at 100° F. of 53 SSU and 50 to 60% bottom settlings and water was fed to a settling tank in an organization as disclosed in FIGURE 3. From a level spaced below the top surface of the mixture, liquid was continuously fed to the centrifuge as disclosed in FIGURES 1 and 2. Under analysis, the liquid comprised 5 to 7% bottom settlings and water with 1 to 2% free water and the remainder emulsion and sediment. Discharging from the upper central effluent port 72 of the centrifuge came oil at a rate of 14.7 gallons per minute bearing only .1% bottom settlings and water, the recycle oil and water was fed back into the settling tank at the rate of 13 to 16 gallons per minute and included 6 to 7% bottom settlings and water. For practical purposes no oil was present in the settling tank discharge.

The centrifuge comprised a stationary circular wall enclosing a disc stack having 88 discs spaced by .038" uniformly. The stack was driven at 580 r.p.m. by a 1 H.P. motor.

*Example 2*

A mixture of oil having an API density rating of 39.25° at 86° F. and a viscosity at 100° F. of 43.6 SSU and 44% bottom settlings and water (10% free water) was fed to a settling tank in an organization as disclosed in FIGURE 3. From a level spaced below the top surface of the mixture, liquid was continuously fed to the centrifuge. Under analysis, the liquid comprised 7% bottom settlings and water with 5% free water. Discharging from the central effluent port of the centrifuge came oil at a rate of 14.7 gallons per minute bearing .2% bottom settlings and water, or 8.8 gallons per minute bearing .1% bottom settlings and water depending on valve settings. The recycle oil and water fed back into the settling tank at the rate of 8.0 gallons per minute and included 16% bottom settlings and water. For practical purposes no oil was present in the settling tank discharge.

The centrifuge comprised a stationary circular wall enclosing a disc stack having 88 discs spaced by .038" uniformly. The stack was driven at 478 r.p.m. by a 1½ H.P. motor.

The reason for the effectiveness of the organization disclosed including the settling tank on recycle is not known. It may be assumed that in the settling tank which is quiescent, the heavy phase drops from the stubborn emulsion at the interface. This will enrich the liquid of lesser density in the tank. From above the heavy phase, lighter liquid and emulsion are continuously fed to the centrifuge. The separating action of the centrifuge described occurs in the zone of its disc stack to which the light liquid flows for separation. Heavy particles entrapped in the light liquid are thrown outwardly in the disc stack and only the light phase is discharged inwardly and upward. Thus the emulsion is concentrated for return through the opening in the lower end of the centrifuge to the settling tank. From this returned emulsion heavy particles settle out in the settling tank, etc.

The settling tank and the centrifuge may be regarded as a team, the quiescent nature of the settling tank serving economically to drop out the heavy phase from the emulsion, and the centrifuge with the stationary wall serving effectively to lead off the light phase and concentrate the emulsion.

It is, of course, preferred to provide a settling tank 62 in the recycle line to give longer residence time to the recycled liquid, increasing the opportunity for the heavy phase to drop out of the interface with consequent enrichment of the liquid of lighter density in the recycle and incoming feed. However, as noted above, some of the major benefits of the organization will be retained by omitting the settling tank 62 and running line 68 back into the centrifuge at 67 along with the feed 69. Under this modification, heavy phase can be discharged directly from the lower end of the centrifuge shell which may be elongated for the purpose, the liquid of heavier density (line 68) being withdrawn from the centrifuge at a point spaced above the lower end and below the rotating structure 37. Alternatively, the heavy phase can be bled from line 68 by appropriate means. It will be clear that even with such an alteration, the constance of feed to the centrifuge will not depend solely on the constance of the feed mixture 69, but can be favorably modified by the combining with the feed mixture of a large measure of recycle liquid from pipe 68.

Since one of such fields is that of removing water (which may or may not contain salt and/or sand) from crude petroleum oil, the invention has been more particularly described in connection therewith, it being understood that this is by way of illustration and not of limitation.

While this invention has been disclosed in only a limited number of forms, it is not so limited, but, as will be obvious to those skilled in the art, is susceptible of various changes within the scope of the appended claims.

We claim:

1. The process of separating a lighter phase from a heavier phase in a feed mixture of such phases comprising the steps of introducing the feed mixture to a gravity settling zone, allowing the feed mixture to settle to a lighter stratum and a heavier stratum, continuously removing liquid from a level in the lighter stratum below the top surface of the feed mixture and feeding it at a substantially uniform rate at a fixed point substantially tangentially to a centrifuging zone having a stationary boundary wall and a rotating structure therein, said liquid being separated in said centrifuging zone into an inwardly flowing lighter phase and an outwardly flowing fluid of greater density than the lighter phase, separately removing the lighter phase and the fluid of greater density from said zone of centrifugation, and feeding the fluid of greater density in a stream back into the gravity settling zone at a height spaced below said level and above the heavier stratum whereby a heavier portion of the stream settles to the heavier stratum and a lighter portion rises to said level to be recirculated back into the centrifuging zone, and removing a portion of the liquid comprising the heavier phase from the heavier stratum of the gravity settling zone when said last-named phase accumulates to a predetermined level below said height.

2. The process of separating a lighter phase from a heavier phase in a feed mixture of such phases comprising the steps of introducing the feed mixture to a gravity settling zone, allowing the feed mixture to settle to a lighter stratum and a heavier stratum, continuously removing liquid from a level in the lighter stratum below the top surface of the feed mixture and feeding it at a uniform rate at a fixed point tangentially into the periphery of a centrifuging zone having a stationary boundary wall, some of said liquid rotating inwardly toward the center of said centrifuging zone through a plurality of separating spaces, maintaining the rotation of the liquid in said zone, said liquid being separated in said centrifuging zone into an inwardly flowing lighter phase and an outwardly flowing fluid of greater density than the lighter phase, separately removing the lighter phase and the fluid of greater density from said centrifuging zone, feeding the fluid of greater density in a stream back into the gravity settling zone at a height spaced below said level and above the heavier stratum whereby a heavier portion of the stratum settles to the heavier stratum and a lighter portion rises to said level to be recirculated back into the centrifuging zone, and removing a portion of the liquid comprising the heavier phase from the heavier stratum of the gravity settling zone as the heavier phase when it accumulates to a predetermined volume.

3. A process as described in claim 2 wherein an emulsion breaking agent is added to the fluid of greater density as it is fed back to the gravity settling zone.

4. The process as described in claim 2 which includes the additional step of controlling the residence time of lighter phase in the centrifuging zone by regulating the rate of discharge of fluid of greater density from the centrifuging zone.

5. The process as described in claim 2 including the additional step of controlling the rate of discharge of lighter phase from the centrifuging zone.

6. The process as described in claim 2 including the additional step of maintaining the surface level of liquid in the settling zone substantially at a fixed height above the level at which liquid is withdrawn to be fed to the centrifuging zone.

7. In combination, a gravity settling tank and a centrifuge, said centrifuge having a stationary peripheral wall, a central structure therein adapted to be rotated, and a substantially tangential inlet passage in the stationary peripheral wall thereof, means for feeding a mixture of a lighter phase and a heavier phase into the settling tank whereby said mixture will separate into a lighter stratum and a heavier stratum, means for maintaining the surface of the mixture in the settling tank substantially at a fixed height, means including a substantially constant displacement pump for withdrawing liquid from said tank at a level spaced below said height and supplying it at a substantially uniform rate to said centrifuge through the substantially tangential inlet passage thereof, means for driving said central structure adapted to be rotated, means for removing and discharging a lighter phase from a central portion of the centrifuge, means for removing a fluid of greater density than the lighter phase from the centrifuge and feeding it to the settling tank at a point spaced below said level, means for removing and discharging the heavier stratum from the settling zone as a heavier phase, means for controlling the discharge of said heavier stratum and means responsive to the level of the heavier stratum to actuate said heavier phase discharge means to discharge said heavier stratum after the same has accumulated to a predetermined level below said point.

8. The combination as described in claim 7 wherein additional means are provided to sense the quality of the lighter phase and appropriately control the rate of removal of fluid of greater density from the centrifuging zone.

9. The combination as described in claim 7 including additional means for feeding emulsion breaker to the gravity settling tank along with the fluid of greater density.

References Cited in the file of this patent

UNITED STATES PATENTS

| | | |
|---|---|---|
| 1,873,598 | Jones | Aug. 23, 1932 |
| 2,167,160 | Raymond | July 25, 1939 |

FOREIGN PATENTS

| | | |
|---|---|---|
| 105,479 | Sweden | Sept. 8, 1942 |
| 1,207,441 | France | Sept. 7, 1959 |